Patented Oct. 24, 1961

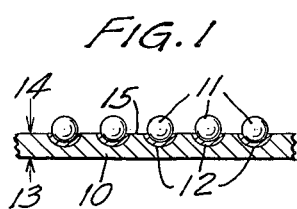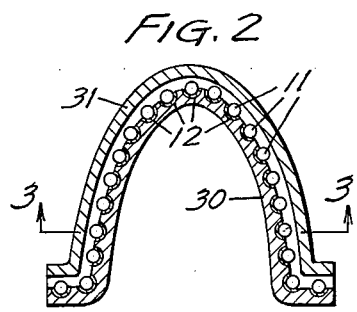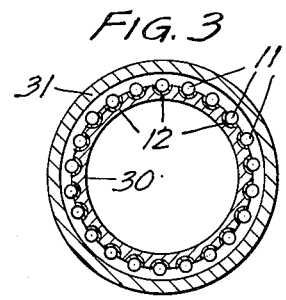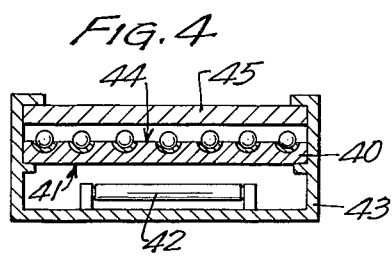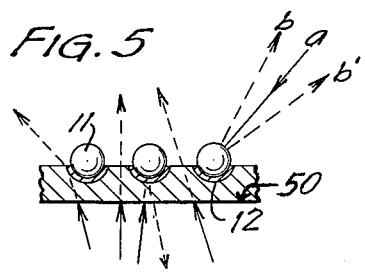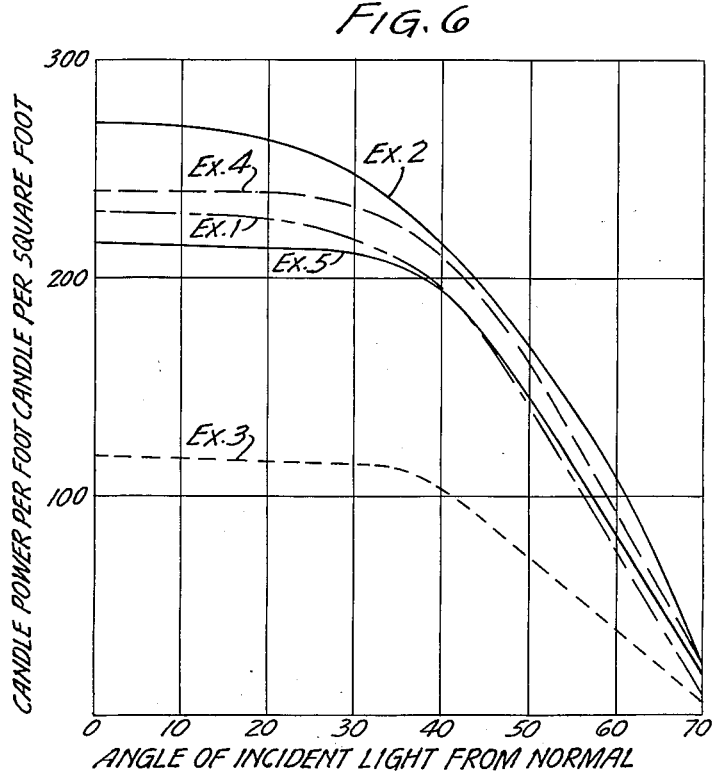
INVENTOR
VICTOR WEBER

3,005,382
REFLEX-REFLECTING SHEET MATERIALS
Victor Weber, St. Paul, Minn., assignor to Minnesota Mining and Manufacturing Company, St. Paul, Minn., a corporation of Delaware
Filed Nov. 25, 1957, Ser. No. 698,592
8 Claims. (Cl. 88—82)

This invention relates to light-transmitting and yet brilliantly reflex-reflecting sheet materials.

The essential optical features of the new structures of this invention are built into a unitary flexible sheet material which is readily and easily formable into a variety of "stable" shapes. For example, it may be formed into a "tear-drop" by heat-pressing it into such shape and then cooling. After cooling, it will retain such shape, yielding under stress but springing back to such shape after release of stress.

One of the chief advantages of the present invention lies in the area of providing greater variety and flexibility in the design possibilities for taillights of automobiles. Functionally, a taillight should not only reflect light originating from an automobile approaching the taillight, but also should be capable of emitting light itself under certain conditions, as when brakes are applied or during nighttime driving conditions.

Usually, taillights are so designed that a small electric lamp is situated at the internal focal point of an elliptical reflector, with a "lens" fitted over the "open" end of the elliptical reflector. The "lens" may or may not actually perform a light-concentrating or dispersing function; its actual function frequently being two-fold: (1) that of serving as a protective cover glass to retard the entrance of dirt into the taillight; and (2) that of serving as a reflector itself for light directed upon it from an outside source. Current construction for taillights of this type has centered around the use of polymethylmethacrylate lenses which are provided with tetrahedrals on their inside surface, the tetrahedrals functioning to reflect light coming into the lens from an outside source, but doing so mainly only in the case of light directed essentially perpendicular to the external surface of the "Lucite" lens.

One of the objects of this invention is to provide lens materials which may be used to construct taillights so that they reflect light directed upon them even at substantial angles to the perpendicular, e.g., even at an angle of about 45° to the normal. This will readily be seen to constitute an improvement in the safety factor of flat-lens taillight functioning inasmuch as it will permit reflex-reflection of light by taillights of automobiles parked at a 45 degree angle to a curb, even though the incident light directed upon such taillights is from an automobile passing the row of parked automobiles, and necessarily therefore directed upon the taillights of the parked automobiles at an angle of about 45°. Polymethylmethacrylate tetrahedral lenses are incapable of functioning to reflex-reflect light directed upon them at such a great angle of incidence.

In fabricating polymethylmethacrylate tetrahedral lenses (such lenses being usually fabricated so as to rest in a single plane, or with only a slight bulge), considerable expense is incurred in a necessary preliminary step of preparing suitable molds and dies. Thus, it is economically impractical to provide automobiles with a great variety of taillight designs using tetrahedral principles, simply because the amortization costs for a tetrahedral die of any one design, if spread over only a few taillights as compared to several hundred thousand, would result in almost prohibitive costs to be passed on to the consumer. Yet consumer appeal places a premium upon flexibility in automobile design, and varied taillight design is one feature of automobile appearance which has necessarily been limited in the past. This invention, however, opens the door to the possibility of a multitude of different designs for taillights, some of which may be without a duplicate, without at the same time raising the ultimate consumer price to a prohibitive extent. In fact, the economy introduced in taillight design possibilities by the present invention may well permit "personalized" taillights without prohibitive, or even significant, if any, increase in cost to the consumer. No expensive die costs need be amortized over a larger number of automobiles in using the present teaching.

The design flexibility possible for taillights fabricated using the sheeting of this invention also permits, for the first time, economical formation of compound curve shapes such as "blisters," "tear-drops" and other shapes, which give the impression of speed and movement, as desired, without sacrifice of the functional properties which in general are now considered essential from a safety standpoint for taillight structures.

Die methods of tetrahedral production also inherently render large article production impractical, in an economic sense, when the essential features required can be achieved with smaller articles formed using more economical smaller dies. Taillight structures of this invention, not being formed by expensive dies, may be made economically in both large and small sizes.

Where tetrahedrons are employed in taillight structures, dirt sometimes gradually works its way within the taillight and deposits a film upon the projecting tetrahedron structures, lowering their reflection qualities so drastically that any reflex-reflection becomes barely noticeable. Such dirt contamination can be prevented by hermetically sealing the area behind the tetrahedrons from external atmosphere, but this is done only at an increase in cost. Following the practice of this invention, hermetic sealing is unnecessary; and reflex-reflection of high brilliancy is retained even after some dirt contamination of the structure. While I do not wish to be bound by theory, it is my belief that this difference between tetrahedral structures and those of my invention can be accounted for in large part by the fact that tetrahedrons are precision optical reflectors which are readily upset by contamination, whereas my structures are relatively less precise in their optical characteristics and are, therefore, relatively less affected adversely by contamination.

Although my invention finds special utility in the art of taillight fabrication, it is also of practical use, and provides new results, in a wide variety of other applications. For example, structures of this invention may be employed in the fabrication of signs and markers which may be illuminated by either internal or external light, or both. Thus, using the sheet material hereof, advertising signs on public streets may be formed so as to appear much like conventional internally illuminated "frosted" signs, but additionally to function as brilliant reflex-reflectors of light during hours of darkness when internal illumination would be unnecessarily costly, or in the event of internal illumination failure. Signs formed from my sheet materials serve as constant nighttime attention-getters to the driving public, regardless of local lighting conditions, and also can be internally self-illuminated when additional attention-getting qualities are desired.

One place where such signs as made possible by this invention are particularly useful is in super highway "turn-off," junction and like markings. Such road markers are usually self-illuminated for attention-getting qualities, but in the event of electrical failure, it is imperative that the sign exhibit emergency "illumination" so as to obviate driver mistakes and emergency slow-downs caused by lack of route information. Practical application of the teachings of this invention provides one solution to this problem.

As an added advantage, particularly of benefit to automobile manufacturers, the sheet material hereof is so constructed as to be light in weight per unit of area and so as to permit of rolling it into compact rolls for shipping and storage.

The nature of the sheet material of this invention, having the special features essential to the attainment of results aforedescribed, is such that it comprises a plurality of reflex-reflecting complexes—each complex including a minute sphere-lens in optical connection with minute specular-reflecting means underlying the same—distributed in oriented relationship in a layer and held in position by a translucent, flexible, formable and non-fibrous binder. The minute sphere-lenses of this structure are so small that several hundred billion of them are required to fill one cubic foot of volume, yet according to this invention, these tiny bodies are each provided with a minute specular reflector on their back extremity to form a complex, and the complexes bonded in oriented position in a translucent layer to form a sheet material.

The sheet material itself, despite its reflex-reflecting properties, also is transmissive to light. The attainment of all these properties in a single sheet material is indeed surprising, but to accomplish this in a practical, simple and economical manner, as herein taught, so as to make these sheet materials available at reasonable prices, is even more surprising, particularly in view of the minute size of the complexes aforediscussed.

In explaining the essential features and principles of this invention, reference will be made to a drawing, made a part hereof, so as to facilitate ready understanding.

In the drawing:

FIGURE 1 is a sectional view through a sheet material hereof;

FIGURE 2 is a sectional view through a taillight "blister" lens structure formed using the principles of this invention;

FIGURE 3 is a sectional view through a taillight "blister" lens structure taken through line 3—3 of FIGURE 2;

FIGURE 4 is a schematic illustration in sectional view through a sign formed according to the principles of this invention;

FIGURE 5 is a sectional view representation of the optical characteristics of the sheet material of this invention; and FIGURE 6 is a graph of the reflex-reflection properties of the sheet materials of the specific examples hereof, particularly illustrating their large "angularity" of brilliant reflex-reflection.

In FIGURE 6 the angle of incident light from normal (abscissa) is plotted against the brilliancy of reflex-reflection (ordinate) for each sheet structure of the examples. Brilliancy of reflex-reflection is set forth in terms of candlepower per foot candle of incident light, per square foot of sheet material. Data for the graph was obtained by observation of reflex-reflective brilliancy at an angle of 0.3 degree from each incident beam used to test the sheet materials.

Referring now particularly to FIGURE 1 of the drawing, the sheet material 10 of this invention has a plurality of reflex-reflecting complexes which comprise a sphere-lens 11 in optical connection with an underlying specular-reflecting means 12. The underlying specular-reflecting means is illustrated as comprising a concentric cap on the lower portion of the sphere-lens itself.

The reflex-reflecting complexes themselves are oriented with their reflecting caps 12 toward the back face 13 of the sheet material 10, and with their sphere-lenses facing the front face 14 of the composite sheet material and providing a lenticular surface thereupon. A flexible, formable, non-fibrous binder 15 holds the reflex-reflecting complexes in oriented position in the composite sheet material. The binder actually extends between portions of the minute reflex-reflecting complexes, holding them in a monolayer; and it is translucent, permitting light to pass through the sheet material between the specular-reflecting means of the light-reflecting complexes. As here employed, the word "translucent" not only means and includes within its scope the form of light transmission characterized as imperfect or diffuse, but also includes the more "perfect" form of light transmission frequently characterized as "transparent" (i.e., the form of light transmission which permits images on the other side of the medium to be seen).

While considerable space is shown between each of the reflex-reflecting complexes in the drawing, this is done for convenience of illustration; and in actual sheet structures formed as herein taught, the reflex-reflecting complexes may be, and usually are, crowded together in a monolayer so that the sphere-lenses of the complexes are in tangential contact with adjacent complexes in the layer. Despite the crowding together of the complexes, a significant portion of the total area of the sheet material still is translucent to light, the light actually passing through the sheet material between and amongst (and, in some cases, through) the minute reflecting means of the complexes.

Depending upon the specific application to which my sheet material is to be put, the necessary light transmission characteristic may be varied. As a practical matter, however, sheets hereof transmit at least about 5% of the total light directed upon their back surface. Sheets transmitting as little as 5% or slightly more, i.e., up to about 25%, of the total light directed upon their back surface are most desirable for sign and marker uses. For taillight structures the amount of light transmission is preferably slightly higher than that usually preferred for sign uses, transmissibilities of light on the order of about 20 up to as high as 50% of the directed light (preferably at least about 30%) being desired in combination with brilliant reflex-reflecting properties. Greater amounts of light transmission are attained usually at the expense of lowering reflex-reflection, and such a result is not recommended. FIGURE 5 illustrates graphically the light transmissibility characteristic of my sheet materials; and as there shown, a significant portion of the light (illustrated by solid arrows) striking the back surface 50 is actually transmitted through the sheet. As illustrated, light striking the back surface 50 at an angle is sometimes reflected off of the outer surfaces of caps 12 on sphere-lenses 11 in such a manner as to emerge from the front surface of the sheet material.

Also illustrated in FIGURE 5 is the principle of reflex-reflection exhibited by my sheet structures. As there graphically shown, incident beam "a" of light striking the front face of the sheet structure at an angle to the normal is refracted and reflected by the reflex-reflecting complex of the sheet structure so that a brilliant cone b—b' is returned toward the source of light with the axis of the cone essentially common with the beam of incident light. It will be understood that not all of the light striking the front face of my sheet material is actually returned toward the source of incident light, but a large proportion of the incident light is so returned and reflex-reflection brilliancies of high magnitude, as illustrated in FIGURE 6, are obtained.

The various characteristics and properties of reflex-reflection, e.g., brilliancy, angularity, dispersion, etc., have been disclosed in several prior art patents, for example, U.S. Patents Nos. 2,294,930 to Palmquist, 2,326,634 to Gebhard et al., and 2,407,680 to Palmquist et al. For the sake of brevity of description, these patents are incorporated herein by reference.

Aside from surface refraction and reflection characteristics, the factors affecting the amount of light transmitted by my sheet material are mainly these: (1) the opacity of the specular-reflecting means of the complexes and the total over-all area effectively covered by such means; (2) the thickness and the inherent light transmissibility of the bond layer, including any foundation or backing layer; and (3) the concentration of the reflex-reflecting complexes per unit of area throughout the sheet material.

As the opacity of the reflecting means is decreased, transmissibility of the sheet material to light is increased; also a decrease in the size of the reflecting means increases light transmissibility, where other factors remain the same. The concentric cap reflector forms an end segment covering over the lower extremity of the sphere-lens and this end segment should comprise at least about 25% of the height or diameter of the sphere-lens for retention of desired angularity of reflex-reflection. Reflector caps covering as much as 50% of the height of the sphere-lens (i.e., hemispherical caps) are useful, but in general, caps or reflector end segments which extend up to the sides of the sphere-lenses a distance between about 30 and 40% of the diameter of the sphere-lenses give the best balance of brilliancy and angularity of reflex-reflection.

By reducing the height of the bond up along the sides of the sphere-lenses and their associated reflectors, an increase in light transmission by the sheet material takes place, assuming other factors remain remain unchanged. If the bonding layer is increased in thickness, some decrease in light transmission is noted; and the inherent light transmissibility of the bonding layer is affected by the material or materials employed therein, including the possible presence of fillers (e.g., $TiO_2$), colorants and the like, if any.

Lowering the concentration of reflex-reflecting complexes per unit area of my sheet material will serve to increase the light transmission of the sheet material where other factors remain unchanged.

Various non-fibrous materials to use as the binder for my sheet structures are illustrated in the specific examples to follow. Suitable binders to employ are translucent to light, and even may be transparent. Where translucent polymeric organic resins are employed as the binder, desired properties of flexibility, stretchability, retractability, and formability of the sheet material are readily obtained.

Tiny glass beads having diameters as small as a few microns up to about 125 microns and having refractive indices ($n_D$) on the order of about 1.9 have been found preferable to employ as sphere-lenses in my structures, where maximum brilliancy of reflex-reflection is desired. Glass beads, or equivalent, of higher refractive index than about 1.9, however, may be employed as sphere-lenses in sheet structures formed using the principle of this invention where lower brilliancies of reflex-reflection can be tolerated. Where sphere-lense of higher refractive index than 1.9 are desired to be used, the optical teaching relative to spacing as set forth in Palmquist U.S. Patent No. 2,407,680 may be employed in preparing sheet materials using principles of this invention. In cases where lenticular front surfaces are employed, as illustrated in the drawings hereof, the refractive index of the beads or composite sphere-lenses (whether consisting of beads alone or beads coated with an optical layer, or beads provided with a translucent spacing cap) should not vary greatly from the range of about 1.7 to 2.0, about 1.9 being preferred for maximum brilliance.

The reflecting means or concentric cap coated in a concentric manner about at least a portion of the underlying extremity of the sphere-lenses hereof should present a specular-reflecting surface for light striking it from within the sphere-lenses; and it suitably is formed using metals such as, for example, silver, aluminum, etc. It is most practical to employ chemical deposition techniques to form a layer of reflecting coating on the sphere-lenses, but other means such as, for example, vapor deposition techniques are suitable to employ.

A series of non-limitative and illustrative examples will now be offered to teach those skilled in the art how to form the sheet structures hereof. All parts in the examples are by weight unless otherwise specified.

*Example 1*

A 10 mil thick sheet of cellulose acetate butyrate was coated with a 1.5 mil thick layer of a solution formed of 16.67 parts of ½ second cellulose acetate butyrate and 25 parts of an aryl sulfonamide-formaldehyde resin dissolved in a mixture of solvents consisting of 25 parts of butyl lactate, 20 parts of toluene, 10 parts of methyl ethyl ketone, 3 parts of ethyl alcohol and .33 part of butyl alcohol. The ½ second cellulose acetate butyrate was obtained commercially from Eastman Chemical Products, Inc., of Kingsport, Tennessee, and is a low viscosity type resin having a melting range of approximately 284–338° F. The aryl sulfonamide-formaldehyde resin for this composition was obtained from the Monsanto Chemical Company under the trade name "Santolite MHP." It is a hard, practically colorless polymeric organic resin which softens at about 144° F. and is rather brittle at normal room temperature.

The applied coating was dried for one minute at 150° F. to remove a substantial portion of the solvent from all portions of it, but leave a sufficient amount of solvent to impart surface tackiness to the coating. Small glass beads which had previously been fully concentrically coated with silver were then freely dropped in copious amounts over the tacky surface coating on the cellulose acetate butyrate backing and lightly pressed therein. Excess beads were brushed away leaving essentially a monolayer of silver-coated beads projecting from the tacky surface.

The silvered beads employed in this example were prepared as follows: About 300 parts by weight of small glass beads having a refractive index of 1.9 and an average diameter of from about 50 to 56 microns were added to about 1200 parts of water containing about 12 parts of silver nitrate in a stainless steel mixing vessel. To this was added 25 parts of a 28% solution of ammonium hydroxide while stirring the mixture. Then about 10 parts of dextrose in 32 parts of water was stirred in the mixture, followed immediately by stirring in a solution of about 6 parts potassium hydroxide in 32 parts of water. Reaction was allowed to proceed for up to about 5 minutes so as to obtain a chemical deposition of silver on the bead surfaces. During this reaction, the beads were stirred or agitated in the mixture. After reaction, the water and components dissolved therein were removed from the coated beads. Then the coated beads were washed with tap water, and dried at about 300° F. with mild agitation for about 5 minutes.

After the silvered beads were applied to the tacky surface, as aforedescribed, the residual solvent in the tacky surface coating was removed by heating the structure for about 10 minutes at 250° F. Then the beaded surface of the sheeting was subjected to a bath of about 10 seconds duration in a solution consisting of 2.7 parts by weight of sulfuric acid, 0.8 part potassium dichromate and 96.5 parts of water. This bath treatment served to remove the silver coating from the portion of the beads not embedded in the dried binder layer. After about 10 seconds in the bath, the sheet structure was rinsed with water and then passed between two soft rubber rollers to remove a major portion of the water prior to subjecting the sheet to warm air to effect substantially complete drying of the same.

This resulting sheet permitted about 30% of the light striking its back surface to pass through the sheet structure and emerge from the front surface thereof. As here formed, the reflector cap and resin bond extended up the sides of beads a distance equal to about 40% of the diameter or height of the beads (i.e., the beads were embedded up to about 40% of their diameter in the resin). The sheet served to provide brilliant reflex-reflection of light directed upon it at a normal angle, as well as at various angles to the normal, as set forth in FIGURE 6. This sheet is particularly useful in applications such as taillights, parking lights, safety lanterns, etc., where relatively high light transmission as well as reflex-reflection is needed.

Where it is desired to render the reflecting cap on sphere-lenses transmissive to light, and yet retain reflex-reflection properties, the time allowed for chemical deposition of silver on glass beads, as aforeillustrated, may be shortened so as to reduce its opacity.

*Example 2*

A sheet of cellulose acetate butyrate having a thickness of approximately 20 mils was placed on a platen and heated to about 285° F. When the film or sheet of cellulose acetate butyrate reached about 245° F., it began to soften and at 285° F. it was very soft. Silvered beads, prepared as in the foregoing example, were heated to 300° F. and then pressed up to about 25% of their height or diameter into the film or sheet of cellulose acetate butyrate by using a hard rubber roll. Excess beads were brushed away and the film allowed to cool to room temperature. Etching of the silver from the front exposed portions of the silvered beads was accomplished as in Example 1, and drying of the sheet structure was also accomplished as set forth in that example.

This sheet transmitted about 20% of the light directed upon its back surface and was brilliantly reflex-reflecting as shown in FIGURE 6.

*Example 3*

Polyethylene coated paper was heated to about 215° F., at which temperature the polyethylene became soft and slightly tacky. Glass beads of approximately 1.9 refractive index and approximately 50 to 56 microns in diameter were spread in a layer over the soft and slightly tacky polyethylene coating. After pressing the beads into the coating to about 40% of their diameter or height, the beaded side of the sheet was coated with a thin opaque layer of aluminum, the aluminum being applied by deposition of aluminum vapor on the structure.

A 10 mil thick sheet of cellulose acetate butyrate, which had been previously coated with transparent pressure-sensitive adhesive so as to form an adhesive layer of about 3 mils thickness, was then laminated, adhesive side down, upon the aluminum-coated surface of the foregoing sheeting. The specific pressure-sensitive adhesive employed on the cellulose acetate butyrate sheet is not critical, but for purposes of illustration, a transparent pressure-sensitive adhesive consisting essentially of polymerized methyl isoamylacrylate (acrylic acid ester of 2-methyl pentanol 4) can be used. This polymer is inherently pressure-sensitive and may be applied to the butyrate backing from solution in heptane, the solution at a concentration of about 22% having a viscosity of about 2500 centipoises. Heptane is only a very poor solvent for the butyrate backing employed, and may be removed quickly from the applied coating at a raised temperature, i.e., about 120–140° F.

In laminating the pressure-sensitive adhesive surface of the cellulose acetate butyrate over the aluminum coating on the beaded polyethylene sheet material, the aluminum capped beads were pressed for about 25% of bead diameter into the pressure-sensitive adhesive layer. Then the polyethylene-coated paper was carefully removed, i.e., stripped, from the laminate. In so doing, essentially all of the aluminum between the beads adhered to the polyethylene-coated paper and was removed with such paper. A cap of aluminum deposited concentrically about the upper exposed or lenticular portion of the beads extending above the polyethylene surface of the polyethylene treated paper, however, was unaffected by the stripping action and remained in the resulting sheet material (i.e., remained as a concentric cap about the lower extremity of the beads anchored in the adhesive surface coating on the cellulose acetate butyrate sheet) to provide the necessary specular-reflecting means underlying the sphere-lenses of the sheet article. The reflector cap and the bond layer (the pressure-sensitive adhesive) each covered the rear portion of the beads for about 25% of the height or diameter of the beads in the resulting structure.

This sheet article transmitted about 30% of light directed upon it and yet was brilliantly reflex-reflecting as illustrated in FIGURE 6.

*Example 4*

This example is offered to illustrate a colored sheet material which actually appears to be silver or white during the daytime as well as at night under reflex-reflective lighting conditions, but which, when internally illuminated (i.e., illuminated from its under-side), appears to be red. This sheet material may be useful where the legend of a sign or marker desirably should change at various times under various illuminating conditions at night.

A 60 mil sheet of methyl methacrylate ("Lucite") was coated with a layer 1.5 mils thick using a solution formed of 12.50 parts of methyl methacrylate, 18.75 parts of the aryl sulfonamide-formaldehyde resin of Example 1, and about 4.0 parts of a transparent red color dye material dissolved in about 46 parts toluene and 18.75 parts butyl lactate. An alizarine lake may be used for the red transparent dye. Vat dyes, as well as pigments, may be used if desired. Suitable coloring ingredients, are, for example, phthalocyanine green, phthalocyanine blue, Watchung Red, etc.

The resulting structure was dried for about one minute at 150° F. so as to remove a substantial portion of the solvents but leave some solvent present to impart surface tackiness to the coating. Silvered beads were applied over this tacky coating, as described in Example 1, and etched to remove silver as described in that example.

The sheet so formed transmitted as a red color about 5% of light directed upon it, and exhibited silver colored reflex-reflection brilliancies as illustrated in FIGURE 6. The reflector caps and resin bond in this sheet covered the rear portion of the beads for about 20% of the height or diameter of the beads.

*Example 5*

A structure was formed as described in Example 1 except that yellow-colored translucent beads were employed. In all other respects, materials and conditions for forming this structure were identical to those in Example 1.

This sheet material presented a whitish-gray appearance when internally illuminated (i.e., illuminated from its under-side), and an attractive yellow appearance when viewed near the source of reflex-reflected light directed upon its front face. It transmitted about 35% of light directed upon it and exhiibted reflex-reflection properties as shown in FIGURE 6. About 30% of the height of the beads of this sheet was embedded in the resin binder, the surface portion of the embedded area of the beads being covered with a silver concentric cap.

All of the foregoing sheet materials are readily formable into compound curve shapes by using slight heat and forming pressure. For example, the sheet material of Example 1 was heated to about 250–300° F. and formed into a "blister" by applying hand pressure and stretching the sheet, with its beaded side outward, over a "plug" having the general outside configuration desired for the "blister." Thereafter the formed sheet material was allowed to cool to room temperature where it retained its shape even after removing it from the "plug." A protective cover of "Lucite" having a similar "blister" configuration but of slightly larger size was also formed; and as illustrated in FIGURES 2 and 3, the light-transmitting, reflex-reflecting "blister" 30 was inserted within the "Lucite" "blister" 31 to form a composite assembly ready for use as a taillight "lens" assembly.

In FIGURE 4, the fundamental elements of a sign structure employing my sheet material are illustrated. As there shown, my sheet material 40 is positioned with its back face 41 in front of a source of internal illumination 42 within a housing 43. The front face 44 of my sheet material is covered by a translucent plate 45. Plate 45 may be provided with letters, indicia, designs or other appropriate intelligence, e.g., "interchange," "turn-off," "Blank's Department Store," etc. In addition, or alternatively, the sheet structure 40 may contain a design of colored glass beads and/or a design of colored binder, thereby permitting the possibility of conveying different intelligence under different lighting conditions.

A special way of utilizing the principles of this invention to convey different intelligence under different lighting conditions is as follows: My sheet material may be formed with a transparent colored legend in or on the binder (e.g., by pigment, by back printing, or by printing prior to setting the reflex-reflecting complexes in the binder), and reflex-reflecting complexes then placed in a different pattern over this legend in the binder. Low intensity internal illumination can be relied upon to convey the intelligence of the transparent colored legend in or on the binder of the sheet material, and external illumination from automobile headlights or the like can be relied upon to convey to the occupants of the automobile the intelligence of the pattern of reflex-reflecting complexes.

The foregoing description is offered to illustrate the essential features of my invention, and is not intended to be limitative of the scope thereof.

That which is claimed is:

1. A flexible, light-transmitting, reflex-reflecting optical sheet heat-formable to shape as described and handleable as a discrete article, said sheet being transmissive to at least 5% and up to 50% of light directed upon its back surface and further being brilliantly reflex-reflecting of light directed upon its front face, and comprising a layer of reflex-reflecting complexes held in physical orientation in said sheet material by a flexible non-fibrous heat-formable light-transmitting binder, said complexes comprising minute sphere-lenses each in optical connection with an underlying specular-reflecting concentric cap on its back extremity away from the front face of said sheet material.

2. The optical sheet of claim 1 wherein at least a portion of the sphere-lenses are colored.

3. The optical sheet of claim 1 wherein at least a portion of the light-transmitting binder is colored.

4. A flexible, optical sheet material heat-formable to shape as desired and characterized by being light-transmitting as well as reflex-reflecting, said sheet material being handleable as a discrete article and comprising a layer of small sphere-lenses having a refractive index of at least about 1.7 and each being associated in optical connection with an underlying specular-reflecting means on its back extremity, and a flexible non-fibrous heat-formable light-transmitting binder holding said sphere lenses and associated reflector means in optical orientation for reflex-reflection of light directed upon the front face of said sheet material, said sheet material being transmissive to between 5 and 50% of light directed upon its back surface.

5. An optical structure comprising a sheet material as described in claim 4 in combination with a separate light transmitting material in the form of a protective cover over the reflex-reflecting face of said sheet material, and electrically actuated means behind said reflex-reflecting sheet material and adapted to illuminate the same.

6. A flexible, light-transmitting, reflex-reflecting optical sheet heat-formable to shape as desired and handleable as a discrete article, said sheet being transmissive to between about 5 and 50% of light directed upon its back surface, and further being brilliantly reflex-reflecting of light directed upon its front face, and comprising a flexible non-fibrous heat-formable light-transmitting binder layer in which a plurality of reflex-reflecting complexes are anchored, said complexes comprising minute sphere-lenses having a refractive index of about 1.9 and having a diameter up to approximately 125 microns, and small specular-reflecting concentric caps about the underlying portion of said sphere-lenses, the portion of said sphere-lenses provided with said caps being embedded in said light-transmitting binder layer to a depth of between about 25 and 50% of the diameter of said sphere-lenses.

7. As a new article of manufacture: a flexible optical sheet material in roll form, said sheet material being heat-formable to shape as desired and light-transmitting, as well as reflex-reflecting, and comprising a flexible, non-fibrous, heat-formable, light-transmitting binder layer and a plurality of reflex-reflecting complexes held in physical orientation by said binder layer so as to effect reflex-reflection of light directed upon the front face of said sheet material, said complexes comprising minute sphere-lenses each in optical connection with a discrete underlying specular reflector means on its back extremity, said sheet material being transmissive to between 5 and 50% of light directed upon its back surface.

8. An attention-getting sign adapted to be self-illuminated by electrical power and yet visible to operators of vehicles at night regardless of whether or not the sign is self-illuminated, said sign comprising self-illumination means actuated by electrical power and, in front of said self-illumination means, a light-transmitting flexible non-fibrous heat-formable layer containing a plurality of reflex-reflecting complexes adapted to reflex-reflect light projected thereon by oncoming vehicles approaching the sign, said complexes comprising minute sphere-lenses each in optical connection with underlying reflective means, the said light-transmitting layer being such that, when said self-illumination means is energized, at least between 5 and 50% of the light from said self-illumination means is projected through said light-transmitting layer to a viewer, and when said self-illumination means is not energized, the said reflex-reflecting complexes will reflex-reflect light projected thereon by oncoming vehicles, so that the message of the sign will be conveyed to the operators of such vehicles approaching in the dark, where or not the sign is electrically illuminated.

References Cited in the file of this patent

UNITED STATES PATENTS

| | | |
|---|---|---|
| 1,569,907 | Beard | Jan. 19, 1926 |
| 1,902,440 | Gill | Mar. 21, 1933 |
| 2,057,395 | Sharp | Oct. 13, 1936 |
| 2,141,159 | Bergstrom | Dec. 27, 1938 |
| 2,326,634 | Gebhard et al. | Aug. 10, 1943 |

FOREIGN PATENTS

| | | |
|---|---|---|
| 305,282 | Great Britain | Feb. 2, 1929 |
| 998,738 | France | Sept. 26, 1951 |